No. 883,315. PATENTED MAR. 31, 1908.
M. JOYCE, Jr.
AUTOMATIC RELEASING DEVICE FOR GANG PLOWS.
APPLICATION FILED JULY 24, 1907.
2 SHEETS—SHEET 1.
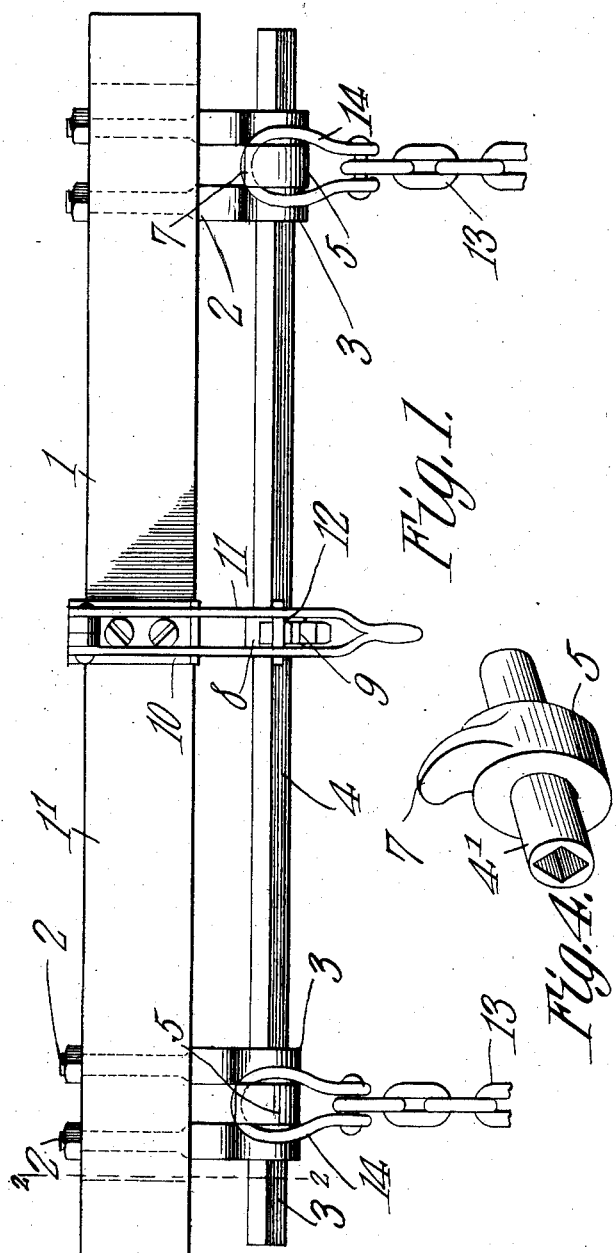
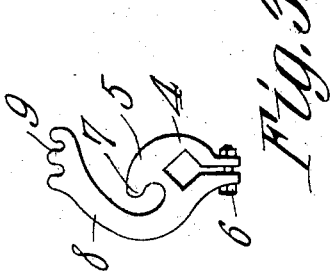
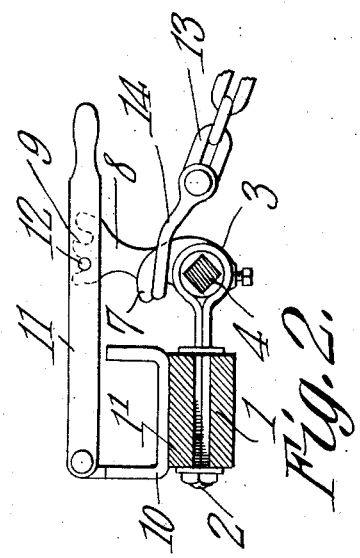
WITNESSES:
Michael Joyce, Jr.,
INVENTOR.
By C. A. Snow & Co.
ATTORNEYS

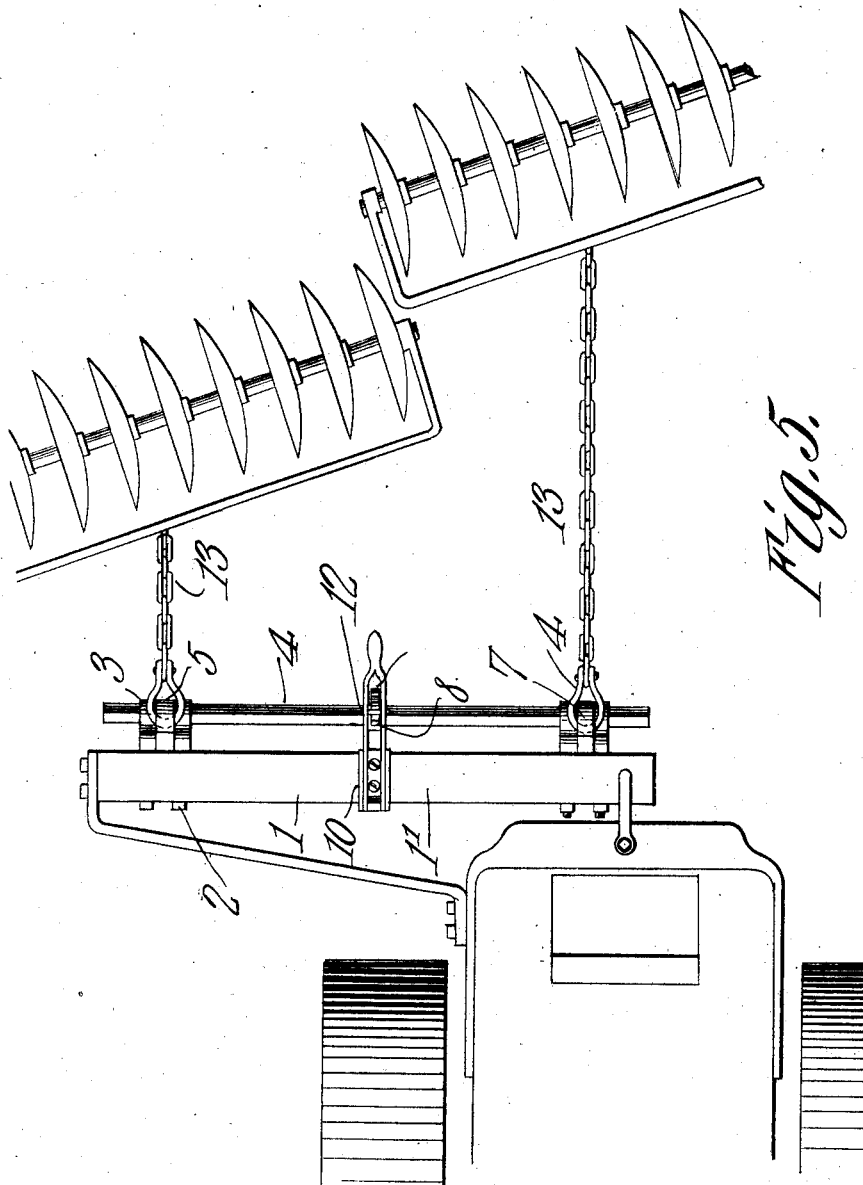

UNITED STATES PATENT OFFICE.

MICHAEL JOYCE, JR., OF BURDETTE, SOUTH DAKOTA.

AUTOMATIC RELEASING DEVICE FOR GANG-PLOWS.

No. 883,315.     Specification of Letters Patent.     Patented March 31, 1908

Application filed July 24, 1907. Serial No. 385,364.

*To all whom it may concern:*

Be it known that I, MICHAEL JOYCE, Jr., a citizen of the United States, residing at Burdette, in the county of Hand and State of South Dakota, have invented a new and useful Automatic Releasing Device for Gang-Plows, of which the following is a specification.

This invention has relation to automatic releasing devices for gang plows and the like and it consists in the novel construction and arrangement of its parts as hereinafter shown and described.

The object of the invention is to provide a device of the character indicated which is adapted to cast off or liberate a series of gangs simultaneously when any one of the gang encounters an obstruction in the ground and which is liable to break the plows or machinery. Where a series of gangs is used for tilling the soil the said gangs overlap each other in the line of draft and should one of the forward gangs become detached from the drafting means the said gang is encountered by the next gang in the rear with consequent injury to both gangs, or, should the rear gang of the series become detached from the drafting means the forward gangs will be advanced considerable distance before they are stopped, consequently, some distance remains between the detached gang and the forward gangs and considerable time and labor is lost in order to advance the detached gang to its proper relative position when it is again connected up with the drafting means. With the present invention, should any one of the gangs meet an obstruction, as above intimated, all of the gangs are simultaneously released and maintain their proper relative positions in the ground. The drafting means can then be moved back and reconnected with all of the gang in a comparatively short period of time and the possibility of one gang colliding with another is eliminated.

The device consists primarily of a rotatable shaft suitably journaled to the draft frame of a traction engine or other drafting means and which is provided with lugs adapted to enter the clevises of the tow chains of the respective gangs of plows. An arm is mounted upon the shaft and bears laterally against a snapping pin which is the weakest element of the combination. When sufficient strain is exerted upon the tow chains or any one of them the snapping pin is broken under the tension and the gangs are simultaneously liberated by the revolution of the shaft.

In the accompanying drawing:—Figure 1 is a top plan view of the releasing device. Fig. 2 is a transverse sectional view of the same cut on the line 2—2 of Fig. 1. Fig. 3 is a side elevation of a combined lug and arm which may be used upon the device. Fig. 4 is a perspective view of a lug used upon the device. Fig. 5 is a top plan view of the device attached to a series of gang plows.

The bar 1 is a part of the draft frame of a traction engine or other drafting means and is composed of two members 1'—1' spaced apart. The bolts 2 pass transversely through the space between the bar members 1'—1' and are provided at their rear ends with the bearings 3. The shaft 4 is non-circular and passes through hubs 4' of the lugs 5, said hubs being journaled in the bearings 3. The laterally adjustable lugs 5 are mounted upon the non-circular shaft and the receiving openings in the hubs of said lugs conform snugly to the contour of the shaft which they receive. Each lug 5 may be provided with a means whereby it may be fixed with relation to the shaft. Such means may be a set-screw or a clamping-bolt 6 connecting opposite jaw members of the lug which receive the shaft. Each lug 5 is provided with a pointed portion 7, the outer side of which is eccentrically disposed with relation to the shaft 4 and the pointed ends of the portions 7 are normally disposed toward the draft bar 1 or in the direction of the line of draft. An arm 8 is fixed to the shaft 4 preferably at its middle and is provided at its upper end with a series of teeth 9. The bracket 10 is attached to the draft bar 1, and the link 11 is pivoted to said bracket. The snapping pin 12 passes through perforations in opposite sides of the link. Said pin is made of wood or other relatively fragile material and is adapted to engage the teeth 9 of the arm 8. The tow chains 13 are provided with the loop clevises 14 which are adapted to receive the lugs 5 and which lie under the pointed portions 7 thereof. A gang of plows is attached to each tow chain. In the form of the invention as illustrated in Fig. 3 the arm 8 is mounted directly upon one of the lugs 5 instead of being located upon the shaft as above described.

The operation of the releasing device is as follows:—The clevises 14 are placed in position upon the lugs 5 and the arm 8 is swung toward the draft bar 1. The link 11 is swung down and the snapping pin 12 is engaged with one of the teeth of the series 9. Thus when any one of the gangs of plows attached to the tow chains meets an obstruction which offers unusual resistance the strain is transmitted through the shaft 4 and arm 8 to the snapping pin 12 which is the weakest point of the device. The said pin is thus broken and the shaft 4 is permitted to rotate so that the pointed portions 7 of the lugs 5 will swing toward the tow chains and simultaneously cast off the clevises 14. By providing a series of teeth 9 upon the arm 8 means is afforded whereby the snapping pin 12 will be broken when subjected to relatively great stress or small stress for the farther around the shaft 4 that the pointed portions 7 of the lugs 5 are moved when in engagement with the clevises 14 the greater stress will the shaft 4 directly bear as the strain is moved more in alinement with the center of the said shaft. The series of teeth 9 upon the arm 8 permits of a variety of positions of the shaft when the lugs 5 are in engagement with the said clevises.

Having described my invention what I claim as new and desire to secure by Letters-Patent is:—

1. In combination with a draft means and a series of independent trailing members, a releasing device interposed between the draft means and said members and adapted to operate for liberating the members simultaneously when any one of them is subjected to excessive stress.

2. In combination with a draft means and a series of independent trailing members, a releasing device consisting of a shaft journaled for rotation, a breakable means retaining the shaft against rotation and lugs located upon the shaft for engagement with the trailing members.

3. In combination with a draft means and a trailing member, a shaft journaled for rotation, a lug mounted upon the shaft and adapted to be adjusted longitudinally thereof, the trailing member engaging said lug and a breakable means for holding the shaft against rotation.

4. In combination with a draft means and a trailing member, a releasing device comprising a shaft journaled for rotation and having means for engaging the trailing member, an arm fixed to the shaft, a link pivoted to the draft means and having a fragile pin adapted to engage said arm.

5. In combination with a draft means and a trailing member, a releasing device consisting of a shaft journaled for rotation and having means for engaging the trailing member, an arm fixed to the shaft and having a series of teeth, a link pivoted to the draft means and carrying a fragile pin adapted to engage the teeth of the arm.

In testimony that I claim the foregoing as my own, I have hereto affixed my signature in the presence of two witnesses.

MICHAEL JOYCE, Jr.

Witnesses:
J. W. HELTIBRIDLE,
F. E. JOYCE.